US009839971B2

United States Patent
Schroth et al.

(10) Patent No.: US 9,839,971 B2
(45) Date of Patent: Dec. 12, 2017

(54) RESISTANCE SPOT WELDING STEEL AND ALUMINUM WORKPIECES WITH HOT WELDING ELECTRODE AT ALUMINUM WORKPIECE

(71) Applicant: GM GLOBAL TECHNOLOGY OPERATIONS LLC, Detroit, MI (US)

(72) Inventors: James G. Schroth, Troy, MI (US); David R. Sigler, Shelby Township, MI (US); Thomas A. Perry, Bruce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 301 days.

(21) Appl. No.: 14/488,799

(22) Filed: Sep. 17, 2014

(65) Prior Publication Data
US 2015/0083693 A1 Mar. 26, 2015

Related U.S. Application Data

(60) Provisional application No. 61/880,564, filed on Sep. 20, 2013.

(51) Int. Cl.
*B23K 37/02* (2006.01)
*B23K 31/02* (2006.01)
(Continued)

(52) U.S. Cl.
CPC ............ *B23K 11/20* (2013.01); *B23K 11/115* (2013.01); *B23K 11/34* (2013.01); *B23K 2203/20* (2013.01)

(58) Field of Classification Search
CPC ....... B23K 11/115; B23K 11/20; B23K 11/34; B23K 2203/20
(Continued)

(56) References Cited

U.S. PATENT DOCUMENTS 4,135,076 A * 1/1979 Beneteau ............... B23K 11/31
219/89
4,694,135 A * 9/1987 Nagel .................. B23K 11/256
219/109

(Continued)

FOREIGN PATENT DOCUMENTS

CN 103097070 A 5/2013
DE 102008028385 A1 * 12/2009 .......... B23K 11/115
(Continued)

OTHER PUBLICATIONS

Wang et al., "Interface microstructure and weld strength of steel/aluminum alloy joints by resistance spot welding," Applied Mechanics and Materials, vol. 117-119 (2012) pp. 1895-1899.
(Continued)

*Primary Examiner* — Quang D Thanh
*Assistant Examiner* — Ket D Dang
(74) *Attorney, Agent, or Firm* — Reising Ethington P.C.

(57) ABSTRACT

A method of resistance spot welding a steel workpiece to an aluminum or aluminum alloy workpiece involves providing a workpiece stack-up that includes a steel workpiece and an aluminum workpiece and preheating the welding electrode that is meant to contact the aluminum or aluminum alloy workpiece. The method further involves pressing the preheated welding electrode and another welding electrode against opposite sides of the workpiece stack-up, with the preheated welding electrode abutting the aluminum or aluminum alloy workpiece, and passing an electrical current between the two welding electrodes at a weld site to initiate and grow a molten weld pool within the aluminum or aluminum alloy workpiece.

20 Claims, 3 Drawing Sheets

(51) Int. Cl.
| | |
|---|---|
| B23K 11/20 | (2006.01) |
| B23K 11/11 | (2006.01) |
| B23K 11/34 | (2006.01) |
| B23K 103/20 | (2006.01) |

(58) Field of Classification Search
USPC ...... 228/178, 193, 262.41, 262.5; 219/86.31, 219/78.01, 86.1, 91.2, 91.22, 117.1, 118, 219/86, 86.4, 89, 91, 91.1, 91.21, 92, 219/108, 109, 110, 111, 117 R; 428/594, 428/600
See application file for complete search history.

(56) References Cited

U.S. PATENT DOCUMENTS

| | | | | |
|---|---|---|---|---|
| 6,037,559 | A | * | 3/2000 | Okabe ............... B23K 11/115 219/118 |
| 7,850,059 | B2 | | 12/2010 | Kobayashi et al. |
| 7,935,908 | B2 | | 5/2011 | Nakagawa et al. |
| 7,984,840 | B2 | | 7/2011 | Kobayashi et al. |
| 8,020,749 | B2 | | 9/2011 | Kobayashi et al. |
| 8,058,584 | B2 | | 11/2011 | Miyamoto et al. |
| 8,487,206 | B2 | | 7/2013 | Urushihara et al. |
| 2007/0212565 | A1 | * | 9/2007 | Urushihara ........... B23K 11/20 428/577 |
| 2009/0011269 | A1 | * | 1/2009 | Urushihara .......... B23K 11/115 428/594 |
| 2011/0097594 | A1 | * | 4/2011 | Tanaka ............... B23K 11/115 428/594 |
| 2013/0168366 | A1 | | 7/2013 | Kinefuchi et al. |
| 2013/0189023 | A1 | * | 7/2013 | Spinella ........... B23K 11/0026 403/270 |

FOREIGN PATENT DOCUMENTS

| | | |
|---|---|---|
| JP | 11342477 | 12/1999 |
| JP | 4971821 B2 * | 7/2012 |

OTHER PUBLICATIONS

Zhang et al., "Effects of resistance spot welding parameters on microstructures and mechanical properties of dissimilar material joints of galvanised high strength steel and aluminum alloy," Science and Technology of Welding Journal, vol. 16 (2011) No. 2 pp. 153-161.

Weihua et al., "Microstructure and mechanical property of resistance spot welded joint of aluminum alloy to high strength steel with especial electrodes," China Welding, vol. 20 (2011) No. 2 pp. 1-6.

Weihua et al., "Interfacial characterization of resistance spot welded joint of steel and aluminum alloy," China Welding, vol. 19 (2010) No. 4 pp. 6-10.

Zhang et al., "Characterization of Intermetallic Compounds in Dissimilar Material Resistance Spot Welded Joint of High Strength Steel and Aluminum Alloy," ISIJ International, vol. 51 (2011) No. 11 pp. 1870-1877.

Choi et al., "A Hybrid Joining Technology for Aluminum/Zinc Coated Steels in Vehicles," J. Mater. Sci. Technol., 2010, 26(9), pp. 858-864.

Hwang et al., "Dissimilar Metal Welding of Steel to Al—Mg Alloy by Spot Resistance Welding," Advanced Materials Research, vol. 15-17 (2007) pp. 381-386.

Imaizumi et al., "Joining Aluminum Automotive Body Alloys to Mild Steel by Resistance Spot Welding," Journal of the Japan Light Metal Welding and Construction Association, vol. 17 (1979) No. 1 pp. 10-17.

Miyamoto et al., "Dissimilar Joining of Aluminum Alloy and Steel by Resistance Spot Welding," SAE Int. J. Mater. Manuf., vol. 2 (2009) Issue 1 pp. 58-67.

Mortazavi et al., "Investigation on Joint Strength of Dissimilar Resistance Spot welds of Aluminum Alloy and Low Carbon Steel," Advanced Materials Research, vol. 264-265 (2011) pp. 384-389.

Qiu et al., "Resistance Spot Welding between Aluminum Alloy and Low-Carbon Steel," Advanced Materials Research, vol. 189-193 (2011) pp. 3534-3540.

Qui et al., "Interfacial microstructure and strength of steel/aluminum alloy joints welded by resistance spot welding with cover plate," Journal of Materials Processing Technology, 209 (2009) pp. 4186-4193.

Ueda et al., "Effects of Zn-Based Alloys Coating on Mechanical Properties and Interfacial Microstructures of Steel/Aluminum Alloy Dissimilar Metals Joints Using Resistance Spot Welding," Materials Transactions, vol. 52 (2011) No. 5 pp. 967-973.

Yang et al., U.S. Appl. No. 14/181,020 entitled "Electrode for Resistance Spot Welding of Dissimilar Metals," filed Feb. 14, 2014.

Yang et al., U.S. Appl. No. 14/181,955 entitled "Resistance Spot Welding Steel and Aluminum Workpieces with Protuberance," filed Feb. 17, 2014.

Sigler et al., U.S. Appl. No. 14/268,422 entitled "Resistance Spot Welding of Steel to Pre-Coated Aluminum," filed May 2, 2014.

Sigler et al., U.S. Appl. No. 14/462,655 entitled "Resistance Spot Welding Steel and Aluminum Workpieces Using Electrode Weld Face Cover," filed Aug. 19, 2014.

Sigler et al, U.S. Appl. No. 14/464,476 entitled "Multi-Step Direct Welding of an Aluminum-Based Workpiece to a Steel Workpiece," filed Aug. 20, 2014.

Schroth et al., U.S. Appl. No. 14/488,799 entitled "Resistance Spot Welding Steel and Aluminum Workpieces with Hot Welding Electrode at Aluminum Workpiece," filed Sep. 17, 2014.

Carlson et al, U.S. Appl. No. 14/503,504 entitled "Resistance Spot Welding Steel and Aluminum Workpieces Using Insertable Cover," filed Oct. 1, 2014.

Sigler et al., U.S. Appl. No. 14/503,969 entitled "Aluminum Alloy to Steel Welding Process," filed Oct. 1, 2014.

Wang et al, U.S. Appl. No. 14/561,746 entitled "Resistance Spot Welding Steel and Aluminum Workpieces with Electrode Insert," filed Dec. 5, 2014.

* cited by examiner

RESISTANCE SPOT WELDING STEEL AND ALUMINUM WORKPIECES WITH HOT WELDING ELECTRODE AT ALUMINUM WORKPIECE

CROSS-REFERENCE TO RELATED APPLICATIONS

This application claims the benefit of U.S. provisional patent application No. 61/880,564, filed on Sep. 20, 2013, the entire contents of which are hereby incorporated by reference.

TECHNICAL FIELD

The technical field of this disclosure relates generally to resistance spot welding and, more particularly, to resistance spot welding a steel workpiece to an aluminum or aluminum alloy workpiece.

BACKGROUND

Resistance spot welding is used in a number of industries to join together two or more metal workpieces. The automotive industry, for example, often uses resistance spot welding to join together pre-fabricated metal workpieces during the manufacture of a vehicle door, hood, trunk lid, or lift gate, among other vehicle parts. Multiple individual resistance spot welds are typically formed along a peripheral region of the metal workpieces or at some other bonding region to ensure the vehicle part is structurally sound. While spot welding has typically been performed to join together certain similarly-composed metal workpieces—such as steel-to-steel and aluminum alloy-to-aluminum alloy—the desire to incorporate lighter weight materials into a vehicle platform has created interest in joining steel workpieces to aluminum or aluminum alloy (hereafter collectively "aluminum" for brevity) workpieces by resistance spot welding.

Resistance spot welding, in general, relies on the resistance to the flow of an electrical current through contacting metal workpieces and across their faying interface to generate heat. To carry out such a resistance welding process, a pair of opposed welding electrodes are typically clamped at aligned spots on opposite sides of the workpieces at a predetermined weld site. A momentary electrical current is then passed through the workpieces from one welding electrode to the other. Resistance to the flow of this electrical current generates heat within the workpieces and at their faying interface. When the metal workpieces being welded are a steel workpiece and an aluminum workpiece, the heat generated at the faying interface initiates a molten weld pool in the aluminum workpiece. This molten aluminum weld pool wets the adjacent surface of the steel workpiece and, upon stoppage of the current flow, solidifies into an aluminum weld nugget that forms all or part of a weld joint between the two metal workpieces.

Resistance spot welding a steel workpiece to an aluminum workpiece presents certain challenges. For one, steel has a relatively high melting point and relatively high thermal and electrical resistivities, while aluminum has a relatively low melting point and relatively low thermal and electrical resistivities. As a result of these differences, aluminum melts more quickly and at a much lower temperature than steel during current flow. Aluminum also cools down more quickly than steel after current flow has ceased. Controlling the heat balance between the two metals so that a molten aluminum weld pool can be rapidly initiated and solidified in the aluminum workpiece can therefore be challenging. It has been found, for example, that upon rapid cooling using standard industry practices, defects in the molten aluminum weld pool such as shrinkage voids, gas porosity, oxide residue, and micro-cracking are drawn toward and gather at the faying interface. Additionally, prolonged heating during resistance spot welding—more specifically an elevated temperature in the steel workpiece due to its relatively higher resistance—is conducive to the growth of brittle Fe—Al intermetallic layers at the faying interface between the molten aluminum weld pool and the steel workpiece. These two conditions have been shown to reduce the peel strength and weaken the overall integrity of the ultimately-formed weld joint.

SUMMARY OF THE DISCLOSURE

A method of resistance spot welding a workpiece stack-up that includes a steel workpiece and an aluminum or aluminum alloy (again, collectively referred to in this disclosure as "aluminum" for brevity) workpiece is disclosed. The method involves preheating the welding electrode that will be brought into contact with the aluminum workpiece. Preheating means that active measures are taken to increase the temperature of the welding electrode before that welding electrode is pressed against the workpiece stack-up at a predetermined weld site and used in conjunction with another welding electrode on the opposite side of the stack-up to form a weld joint between the steel and aluminum workpieces. After being preheated, and while still hot, the heated welding electrode is pressed against the aluminum workpiece and another opposing welding electrode is pressed against the steel workpiece, and an electrical current is passed between the electrodes at a weld site to ultimately form a weld joint between the workpieces.

Two exemplary techniques for preheating the aluminum side welding electrode are disclosed, although other preheating techniques are indeed possible. One technique involves bringing the welding electrodes together with their weld faces in direct contact with each other, and then passing electrical current between the welding electrodes while restricting or altogether halting the cooling mechanism (typically water cooling) incorporated into the aluminum side weld electrode. The other technique involves clamping the welding electrodes over a plate, which can be separate from or integrated into the workpiece stack-up, and then passing electrical current between the welding electrodes and through the plate while, like before, restricting or altogether halting the cooling mechanism incorporated into the aluminum side weld electrode. When performing these and other preheating techniques, it is possible to heat the aluminum side welding electrode to temperatures of above 200° C., and preferably between 200° C. and 900° C., which can help facilitate the subsequent spot welding process.

Preheating the welding electrode that eventually abuts the aluminum workpiece furnishes more heat to the aluminum workpiece than would otherwise be the case during resistance spot welding of the workpiece stack-up. The heated welding electrode, in particular, introduces heat into the aluminum workpiece at the weld site in addition to, and from the opposite direction of, the heat developed in the steel workpiece due to the higher thermal and electrical resistivities of the steel (compared to the aluminum). This additional heat is believed to alter the solidification behavior of the molten aluminum weld pool created in the aluminum workpiece in a way that precludes the unwanted accumulation of defects at and along a faying interface of the workpiece stack-up. It can also reduce the heat that needs to be generated in the steel workpiece which, consequently, inhibits the growth of brittle Fe—Al intermetallic layers at the faying interface. The overall strength and integrity of the weld joint established between the workpieces can hence be improved by use of the disclosed method.

DETAILED DESCRIPTION

The methods and welding electrodes detailed in this description resolve several challenges encountered when resistance spot welding a workpiece stack-up that includes an aluminum workpiece and a steel workpiece. Though described in more detail below, in general the described methods and welding electrodes can alter the solidification behavior of a created molten aluminum weld pool and thereby limit or altogether preclude the accumulation of defects at the faying interface of the aluminum and steel workpieces. The methods and welding electrodes can also minimize the size and thickness of Fe—Al intermetallic layers formed at the faying interface. Of course, other improvements are possible. Taken together or alone, these measures help maintain suitable peel strength of the weld joint formed between the aluminum and steel workpieces, and help ensure the overall strength and integrity of the joint. And while the methods and welding electrodes are described below in the context of vehicle body panels, skilled artisans will know and understand that such methods and welding electrodes may be used in other contexts such as industrial equipment applications.

Figure 1:
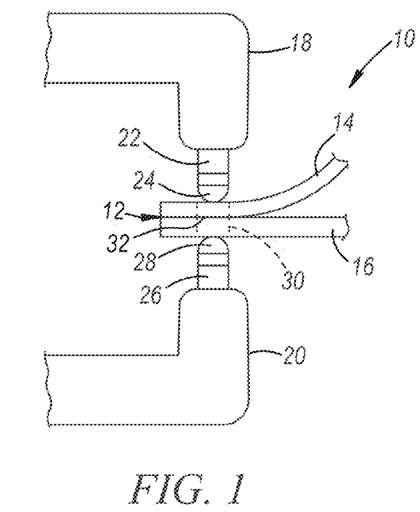
FIG. 1 is a side view of a resistance spot welding assembly.

FIG. 1 shows one example of a resistance spot welding assembly 10 that can be used to resistance spot weld a workpiece stack-up 12 that includes a steel workpiece 14 and an aluminum workpiece 16 that are overlaid on each other. Though not shown in FIG. 1, the workpiece stack-up 12 could include additional workpieces, such as a single aluminum workpiece and two steel workpieces to constitute a stack-up totaling three workpieces. Each of the steel and aluminum workpieces 14, 16 can have a thickness that ranges between approximately 0.3 mm and 6.0 mm, between approximately 0.5 mm and 4.0 mm, and more narrowly between 0.6 mm and 2.5 mm; other thickness dimensions are possible. The term "workpiece" and its steel and aluminum variations is used broadly in this description to refer to a sheet metal layer, a casting, an extrusion, or any other piece that is resistance spot weldable.

The steel workpiece 14 can be a galvanized low carbon steel, a galvanized advanced high strength steel (AHSS), an aluminum coated steel, a low carbon steel, a bare steel, or another type of steel. Some specific kinds of steels that can be used in the steel workpiece 14 include, but are not limited to, interstitial-free (IF) steel, dual-phase (DP) steel, transformation-induced plasticity (TRIP) steel, and press-hardened steel (PHS). The aluminum workpiece 16, on the other hand, can be aluminum, an aluminum-magnesium alloy, an aluminum-silicon alloy, an aluminum-magnesium-silicon alloy, an aluminum-zinc alloy, or another type of aluminum-based alloy. Some more specific aluminum alloys that can be used in the aluminum workpiece 16 include, but are not limited to, 5754 aluminum-magnesium alloy, 6022 aluminum-magnesium-silicon alloy, 7003 aluminum-zinc alloy, and Al-10Si—Mg aluminum die casting alloy. In addition, these and other suitable aluminum alloys (as well as aluminum) may be coated with zinc or conversion coatings typically used to improve adhesive bond performance. Optionally, weld-through adhesives or sealers that are normally used in resistance spot welding operations may be present.

Still referring to FIG. 1, the spot welding assembly 10 is typically a part of a larger automated welding operation that includes a first welding gun arm 18 and a second welding gun arm 20 that are mechanically and electrically configured to repeatedly perform spot welds, as is well understood in the art. The first welding gun arm 18 has a first electrode holder 22 that secures a first welding electrode 24, and likewise the second welding gun arm 20 has a second electrode holder 26 that secures a second welding electrode 28. When engaged in resistance spot welding, the welding gun arms 18, 20 press their respective welding electrodes 24, 28 against opposite sides and outer surfaces of the overlaid workpieces 14, 16 at a weld site 30, with accompanying weld faces of the electrodes 24, 28 being aligned across and with each other. A faying interface 32 is located between the steel and aluminum workpieces 14, 16 at confronting and abutting inner surfaces of the workpieces 14, 16.

Figure 2:
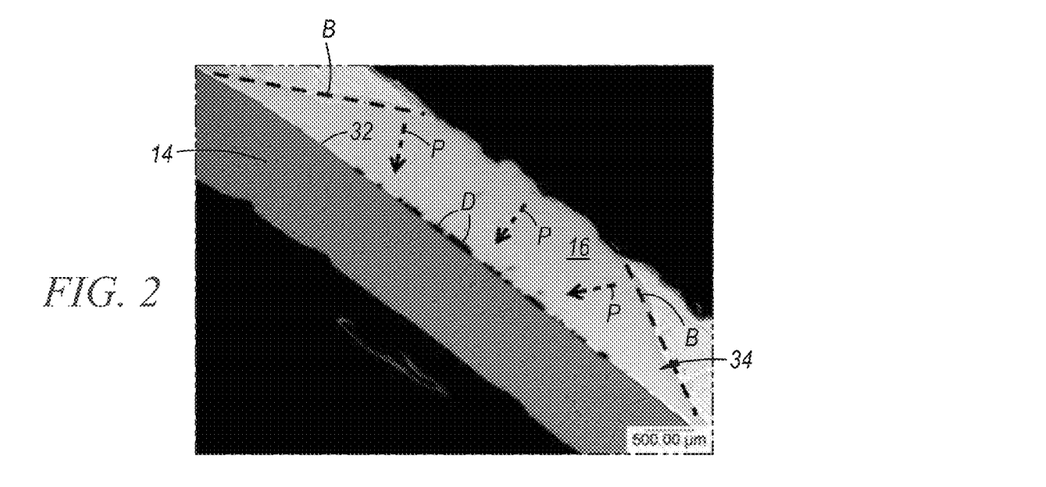
FIG. 2 is a microstructure of a weld nugget formed via a resistance spot welding process without using the methods or welding electrodes detailed in the description below.

FIG. 2 illustrates a microstructure of an aluminum weld nugget 34 formed via a resistance spot welding process without the use of the methods and welding electrodes detailed below. While a suitable weld nugget may be formed in some instances without using the below methods and electrodes, in this example defects D have been discovered at and along the faying interface 32. Among other possibilities, the defects D may include shrinkage voids, gas porosity, oxide residue, and micro-cracking. When present and accumulated along the faying interface 32, it has been found that the defects D may reduce the peel strength of the weld joint established between the steel and aluminum workpieces 14, 16—the aluminum weld nugget 34 being part of the weld joint—and may negatively impact and weaken the overall integrity of the weld joint. Moreover, in addition to the defects D, one or more Fe—Al intermetallic layers (not shown), which are also considered part of the weld joint, may grow between the steel and aluminum workpieces 14, 16 at the faying interface 32. The Fe—Al intermetallic layers can consist of $FeAl_3$ and $Fe_2Al_5$, as well as other compounds, and when present are often hard and brittle. Again, here, the Fe—Al intermetallic layers can have a negative impact on the overall integrity of the weld joint if allowed to grow extensively.

Although not intending to be confined to particular theories of causation, it is currently believed that the accumulation of the defects D at and along the faying interface 32 is due to the solidification behavior of the molten aluminum weld pool as it transitions into the aluminum weld nugget 34. That is, a heat imbalance can develop between the much hotter steel workpiece 14 and the aluminum workpiece 16 because of the dissimilar physical properties of the two metals—namely, the much greater thermal and electrical resistivities of the steel. The steel therefore acts as a heat source, while the aluminum acts as a heat conductor, meaning the molten aluminum weld pool created within the aluminum workpiece 16 cools and solidifies from its outer perimeter toward the faying interface 32 as heat from the weld pool is extracted directionally through the water-cooled welding electrode in contact with the aluminum workpiece. The path and direction of the solidification front is represented in FIG. 2 generally by broken arrows P, and a boundary of the aluminum weld nugget 34 is represented generally by broken lines B. The path P is pointed at the faying interface 32 and the more slanted boundary B (compared to that shown in FIG. 7) is the result of solidification of the molten aluminum weld pool toward the faying interface 32. Directed this way, weld pool defects D are drawn or swept towards the faying interface 32 as the solidification front progresses along path P, and may end up dispersed along the faying interface 32. Furthermore, it is currently believed that the growth of the Fe—Al intermetallic layer(s) is due at least in part to the increased temperature experienced by the steel workpiece 14 during the resistance spot welding process.

Referring now to FIGS. 3-6, several methods and welding electrodes will be described that limit and in some cases altogether prevent the dispersion of defects D within the aluminum weld nugget 34 at and along the faying interface 32 and that minimize the size and thickness of the Fe—Al intermetallic layer(s) thereat. In general, and as described below in greater detail, the methods and welding electrodes generate a relatively increased amount of heat at the welding electrode that is meant to come into contact with, and be pressed against, the aluminum workpiece 16 (in this example, the second welding electrode 28). This is achieved by preheating the second welding electrode 28 before pressing it against the workpiece stack-up 12 at the weld site 30 and resistance spot welding the stack-up 12 to form a weld joint between the workpieces 14, 16. The heated second welding electrode 28, in turn, furnishes a relatively increased amount of heat to the aluminum workpiece 16 than would otherwise be the case. This additional heat input—which is introduced from the second welding electrode 28 at the weld site 30 in addition to, and in the opposite direction of, the heat developed in the steel workpiece 14—affects the solidification behavior of the molten aluminum weld pool as it cools and solidifies into the aluminum weld nugget 34, which is believed to improve peel strength and help ensure the overall strength and integrity of the weld joint established between the workpieces 14, 16.

Figure 3:
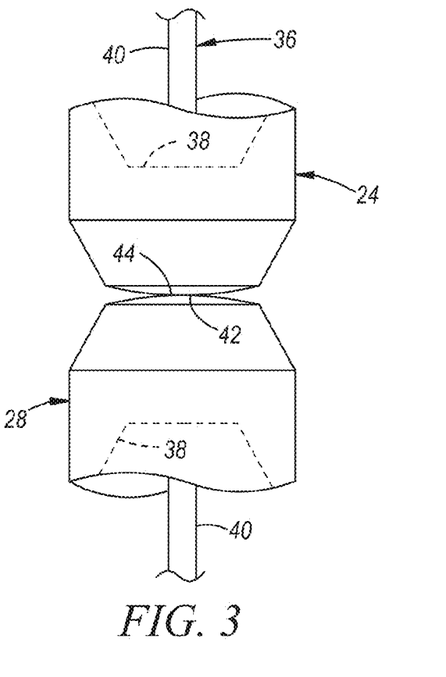
FIG. 3 is a side view of a pair of welding electrodes brought together.

In the embodiment shown in FIG. 3, for example, the first and second welding electrodes 24, 28 are initially brought together with a first weld face 42 of the first welding electrode 24 and a second weld face 44 of the second welding electrode 28 making direct contact with each other. Electrical current is then passed through the first and second welding electrodes 24, 28 while the weld faces 42, 44 are in contact. The electrical current, for example, may be passed for a duration of 100 ms to 5,000 ms or more narrowly from 200 ms to 2,000 ms; of course, other durations are possible.

The level of electrical current can vary in different embodiments in this step, but some examples include a current level of between 10 kA and 50 kA or more narrowly between 20 kA and 40 kA. The passage of electrical current directly between the first and second welding electrodes 24, 28 generates heat at their weld faces 42, 44 and within their electrode bodies.

The accumulation of heat in the second welding electrode 28 is preferably aided by restricting or altogether halting an electrode cooling operation that is typically otherwise implemented. The cooling operation and system incorporated into the second welding electrode 28 can have different designs, constructions, and components depending upon, among other possibilities, the design and construction of the spot welding assembly 10 and the design and construction of the welding electrode 28 itself. In the example of FIG. 3, the cooling operation is achieved by way of a cooling system 36 that includes a coolant pocket 38 located in the second welding electrodes 28 and a coolant tube 40 that communicates with the coolant pocket 38. This design and construction is somewhat common and, though depicted schematically in the figures, will be known to those skilled in the art. The coolant in this example that circulates through the tube 40 and in the pocket 38 can be water. The same cooling operation can also be carried on in the first welding electrode 24, as shown.

Restriction or halting of the cooling operation in the second welding electrode 28 can be controlled to ensure the electrode 28 is preheated to the extent desired. Restricting the cooling operation, as used here, means that the electrode cooling operation is limited to some degree that is less than the cooling operation normally carried out; for instance, a restricted cooling operation could be one that is functioning at fifty-percent (50%) or less of a cooling operation at full capacity and that therefore permits the temperature of the electrode to increase greater than it otherwise would if subjected to full capacity cooling. Halting, on the other hand, as used here, means that the electrode cooling operation is not carried out at all and is shut off to the second welding electrode 28.

In the event that restricting or altogether halting an electrode cooling operation is practiced in the second electrode 28, but not the first electrode 24, it may be helpful to limit the area of contact between the weld faces 42, 44 of the first and second welding electrodes 24, 28 in order to ensure that the cooling operation in the first welding electrode 24 does not extract too much heat from the second welding electrode 28 and, in essence, preclude preheating. In particular, the contact area of the weld faces 42, 44 is large enough to pass current, and thus generate heat, but not too large that the generated heat is readily conducted back into the colder first electrode 28 where cooling is ongoing. The welding electrodes 24, 28, for instance, can be designed so that the contact area between the weld faces 42, 44 during preheating has a minimum of 2 mm in diameter or, more preferably, 3 mm in diameter. This degree of contact allows sufficient current to flow between the welding electrodes 24, 28 without causing them to weld together. The contact area between the weld faces 42, 44, however, should not be so large that the cooled first welding electrode 24 extracts too much heat from the preheated second welding electrode 28. To keep this from happening, for example, the welding electrodes 24, 28 can be designed so that the contact area between the weld faces 42, 44 has a diameter of 15 mm or less or, more preferably, 10 mm or less.

Figures 4, 5, 6:
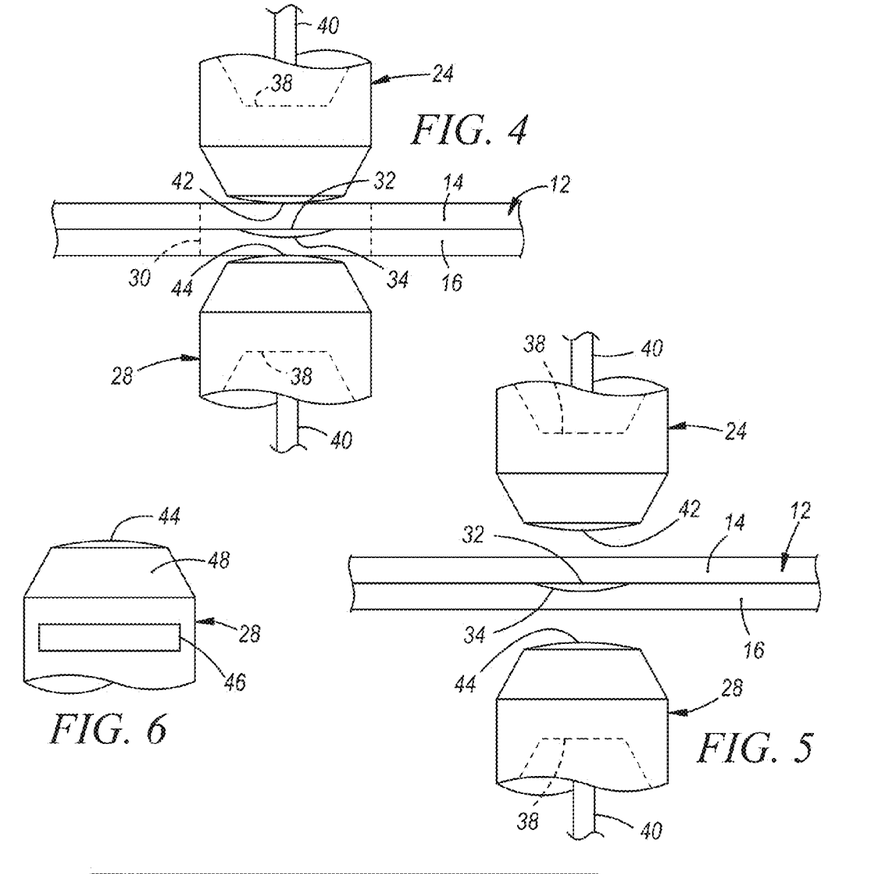
FIG. 4 is a side view of the welding electrodes of FIG. 3 pressed against opposite sides a workpiece stack-up including a steel workpiece and an aluminum workpiece.
FIG. 5 is a side view of the welding electrodes and workpiece stack-up of FIG. 4, with the welding electrodes retracted from the workpiece stack-up.
FIG. 6 is a side view of a welding electrode having an insert.

Once the second welding electrode 28 has been sufficiently preheated, the passage of electrical current is discontinued and the welding electrodes 24, 28 are separated from each other (i.e., retracted) and quickly maneuvered and moved to the weld site 30 of the workpiece stack-up 12. At the weld site 30, the first and second welding electrodes 24, 28 are closed and pressed down with suitable force on the overlaid steel and aluminum workpieces 14, 16. This is shown in FIG. 4. While clamped, a momentary electrical current is passed through the workpieces 14, 16 through the weld site 30. The heat generated by the passage of the electrical current initiates and grows a molten aluminum weld pool that, upon cessation of the electrical current, solidifies into the aluminum weld nugget 34. After the aluminum weld nugget 34 is formed, the welding electrodes 24, 28 are opened and retracted away from and off of the workpieces 14, 16, as shown in FIG. 5. The weld faces 42, 44, if needed, may then be brought back together and electrical current may again be passed between them to preheat the second welding electrode 28 before the welding gun arms 18, 20 are located at the next weld site without adding appreciable time to the process.

As set forth above, the cooling operation of the second welding electrode 28 is restricted or altogether halted for some duration amid the steps described above with FIGS. 3-5. In this way, by the time the second welding electrode 28 is pressed down on the workpieces 14, 16 in preparation for resistance spot welding (FIG. 4), the second welding electrode is hotter than it typically would be with conventional cooling. In the example of the figures, coolant flow is restricted or altogether halted in the coolant tube 40 and coolant pocket 38 equipped in the second welding electrode 28 immediately before electrical current is passed through the first and second welding electrodes 24, 28 while the weld faces 42, 44 are in contact (FIG. 3). Coolant flow may remain restricted or altogether halted until after the welding electrodes 24, 28 are retracted from the workpieces 14, 16 (FIG. 5), and may then resumed if desired. In other embodiments, the cooling operation could be restricted or halted for a period of time beyond that required to perform a single resistance spot welding event, and instead could be restricted or halted for a period of time necessary to perform a series of resistance spot welding events.

Since cooling is not carried out to its normally-full extent during this time, heat is generated and mostly maintained in the second welding electrode 28 due to the electrical current passing through the welding electrodes 24, 28 while the weld faces 42, 44 are in contact and preheating of the second welding electrode 28 is occurring (FIG. 3). In an example, the second welding electrode 28 can be heated to a temperature between 200° C. and 900° C., or between 400° C. to 700° C., although other temperature values are possible and the exact temperature reached will depend upon, among other factors, the electrical current level and its duration of application and the material of the second welding electrode 28. After being preheated, the second welding electrode 28 is maintained at an elevated temperature while it is being used to spot weld the steel and aluminum workpieces 14, 16, which, here, involves keeping the welding electrodes 24, 28 in place and not retracting them from the workpieces 14, 16 until weld nugget solidification occurs. Maintaining clamping and waiting for weld pool solidification can have a desirable affect on solidification behavior, as described in greater detail below. In this embodiment, only the cooling operation of the second welding electrode 28 is restricted or halted, while that of the first welding electrode 24 can be maintained.

To help monitor and control the temperature of the second welding electrode 28, the electrode 28 could be equipped with a thermocouple device to measure its temperature at different times during the preheating and resistance spot welding steps described above. An optical infrared temperature measuring device (IR meter) can also be used in lieu of, or in addition to, the thermocouple device to measure the temperature of the second welding electrode 28. Knowing the temperature could then be used to help manage the elevated temperature of the second welding electrode 28. For instance, it may be desirable in some cases to keep the temperature of the second welding electrode 28 within a certain range that is found to produce weld joints of suitable quality or for weld consistency purposes. If the temperature is below this range, heat could be generated in the welding electrode 28. Conversely, if the temperature is above this range, the welding electrode 28 could be allowed to cool or the cooling operation could even be briefly resumed. In some examples, the thermocouple device could be attached to a side surface of the second welding electrode 28, or could be embedded inside of the body of the electrode 28. If an optical infrared device is used, it could simply be placed to have line-of-sight access to the second welding electrode 28 when needed.

In the embodiments described thus far, the first welding electrode 24, the second welding electrode 28, or both electrodes, can be made from a copper alloy material typically used for welding electrodes such as the copper-zirconium alloy which commonly goes by the designation C15000. Or, the second welding electrode 28 can be made from a copper alloy material that has a greater electrical resistivity than that of the typical copper-zirconium alloys used in the industry. Such a higher electrical resistivity copper alloy generates more heat than the typical copper alloy material when electrical current is passed through it. Examples of copper alloy materials with higher-than-typical electrical resistivities are those having electrical conductivities of sixty percent (60%) and below of the International Annealed Copper Standard (IACS). The electrical conductivity associated with IACS (sometimes referred to as 100% IACS) is the electrical conductivity of commercially pure, annealed copper at 20° C., which is defined as $5.80 \times 10^7$ S/m. Specific examples of these higher resistivity copper alloys include the copper-chromium-nickel-silicon alloy which commonly goes by the designation C18000. Furthermore, the second welding electrode 28 can be made from some other high temperature metals or alloys that, like before, also have an electrical conductivity of sixty percent (60%) and below of the International Annealed Copper Standard (IACS). Examples of such high temperature metals include molybdenum (Mo) and tungsten-copper alloys (e.g., W-45Cu). These types of metals may exhibit an advantage of being less reactive with the aluminum while at elevated temperatures.

The second welding electrode 28 can also be equipped with an insert that has a greater electrical resistivity than the surrounding material of the second welding electrode 28 in order to generate more heat from the passage of electrical current. Referring now to FIG. 6, an insert 46 is embedded in the body of the second welding electrode 28. In this example, the insert 46 is offset from the weld face 44 and spaced from a frusto-conical section 48 of the second welding electrode. This location may be preferable in some cases in which concentrated heat at the weld face 44 is undesirable because it could cause excessive electrode wear or could even melt the aluminum workpiece 16 at the abutted surface or may have other unfavorable consequences. In other embodiments, however, which are not shown in the figures, the insert 46 may be fitted in a cylindrical recess opened and centered at the weld face 44 and extending axially to a depth into the body of the welding electrode 28. In a specific example, the cylindrical recess may have a 10 mm diameter. Whatever the embodiment, the insert 46 can be composed of a steel material like a stainless steel or a bare low carbon steel, or it may be composed of one of the copper alloy materials with greater electrical resistivity set forth above. The insert 46 can also be composed of a refractory metal such as a molybdenum or copper-tungsten alloy material.

Additionally, the welding electrode that undergoes preheating (in this case, the second welding electrode 28) could be designed and constructed to have a more massive and larger body than is typically used or than is needed for electrical current transfer alone. The more massive body may include a larger diameter than the first welding electrode 24. The larger diameter may be provided at the body itself away from the second weld face 44 and without necessarily modifying dimensions of the second weld face 44. By passing electrical current through the more-massive welding electrode during preheating, the total heat generated is increased over that of a standard-sized welding electrode, and hence available for heating of the aluminum workpiece 16 of the stack-up 12, when the welding electrodes 24, 28 are brought together and electrical current is passed between them (FIG. 3). The added material in the more-massive welding electrode provides a similar function as the resistive insert, as described above.

The methods and welding electrodes described above alter the solidification behavior of the molten aluminum weld pool and thereby limit or altogether prevent the accumulation of defects D at the faying interface 32 within the aluminum weld nugget 34. Because heat is generated in the second welding electrode 28 before resistance spot welding is performed, a greater amount of heat is furnished to the outer surface of the aluminum workpiece 16 than typically would be the case with previously-known methods and welding electrodes. The improved heat balance and more even heat distribution changes the cooling action of the molten aluminum weld pool as it solidifies to become the aluminum weld nugget 34 within the aluminum workpiece 16.

Figure 7:
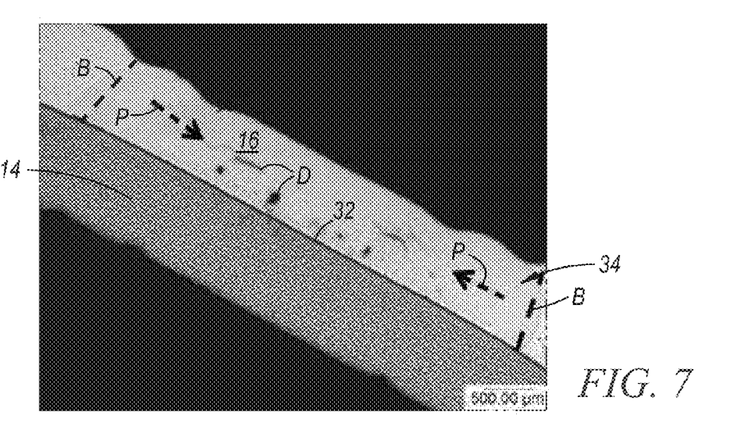
FIG. 7 is a microstructure of a weld nugget formed via a resistance spot welding process using one or more of the methods and/or welding electrodes detailed in the description below.

Referring now to the microstructure of FIG. 7, instead of the solidification front progressing toward the faying interface 32 as is demonstrated in FIG. 2 and described above, the molten aluminum weld pool cools and solidifies inward from its outer perimeter. The path and direction of the solidification front is represented generally in FIG. 7 by broken arrows P, and a boundary of the aluminum weld nugget 34 represented by broken lines B. The path P is pointed toward a central region of the weld nugget 34 and the boundary B is more orthogonal (compared to that shown in FIG. 2) relative to the faying interface 32 as a result of the altered solidification path. Any defects D that are present in the molten aluminum weld pool are thus swept or drawn toward the central region of the weld pool, and eventually the weld nugget 34, and are largely situated away from the faying interface 32, as depicted. This may be facilitated and augmented by keeping the second welding electrode 28 in abutment with the aluminum workpiece 16 during solidification of the molten aluminum weld pool. The second welding electrode 28, because it is hotter, does not draw as much heat from the aluminum workpiece 16 as it otherwise would, or draws none at all. Instead, heat is dispersed laterally out to the cooler portions of the aluminum workpiece 16. As a result of all of this, suitable peel strength is maintained and the overall strength and integrity of the weld joint established between the workpieces 14, 16 is ensured.

Moreover, the improved heat balance also means that the heat on the steel side of the workpiece stack-up 12 can be reduced, if desired, by reducing the electrical current level flowing between the welding electrodes 24, 28 and through the workpiece stack-up 12 during resistance spot welding. These reductions minimize reactions between Fe and Al and thereby minimize the attendant size and thickness of any Fe—Al intermetallic layer(s) that may form at the faying interface 32. It has been determined that the greater the size and thickness of Fe—Al intermetallic layers, the more brittle the layers. Minimizing the layers helps maintain suitable peel strength and helps ensure overall strength and integrity of the weld joint.

A simulation was conducted for carrying out one of the methods detailed thus far. In the simulation, the welding electrode coming into contact with a steel workpiece (i.e., corresponding to the first welding electrode 24) was a ZrCu C15000 electrode actively cooled with a cooling system, and the welding electrode coming into contact with an aluminum workpiece (i.e., corresponding to the second welding electrode 28) was a W-45Cu electrode exhibiting 53% IACS. The two welding electrodes were brought together with their weld faces in direct contact with one another and preheated. Under these circumstances, it was found that suitable conditions for preheating the welding electrode to between 200° C. and 900° C., and more preferably between 400° C. and 700° C., included passing current at a level between 10 kA and 50 kA, and more preferably between 20 kA and 40 kA, for a durations between 100 ms and 5,000 ms, and more preferably between 200 ms and 2,000 ms. Preheating the welding electrode in this way was shown to maintain suitable peel strength and help ensure the overall strength and integrity of the established joint.

Figure 8:
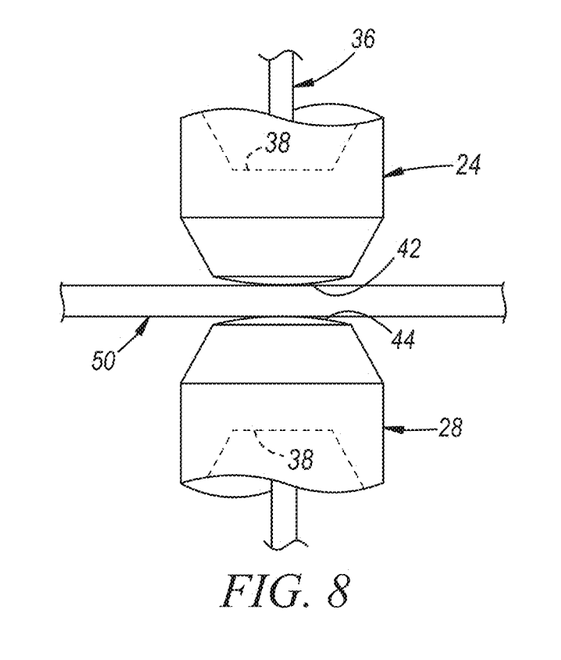
FIG. 8 is a side view of the welding electrodes of FIG. 3 pressed against opposite sides of a plate.

Referring now to FIG. 8, another technique for preheating the second welding electrode 28 is illustrated. Here, the first and second welding electrodes 24, 28 are pressed in alignment against opposite sides of a plate 50 and electrical current is passed between the first and second welding electrodes 24, 28 and through the plate 50 while restricting or altogether halting the cooling operation incorporated into the second welding electrode 28 (as has been previously described). The electrical current may be passed for less than 100 ms and at a level of less than 10 kA. As before, these parameters can heat the second welding electrode 28 to a temperature between 200° C. and 900° C., or more narrowly between 400° C. and 700° C. The plate 50 can be made of a metal material exhibiting an electrical resistivity that is greater than that of the material of the second welding electrode 28. In this way, the plate 50 generates more heat in the second welding electrode 28 than the second welding electrode 28 would otherwise generate on its own, thus heating up the second welding electrode 28 in less time and speeding the overall preheating process. Examples of suitable metal materials for the plate 50 include a steel material like a stainless steel or a molybdenum or copper-tungsten alloy material. In the larger assembly, the plate 50 can be mounted to a fixture or some other structure that is located near the workpiece stack-up 12 or it may be carried on the workpiece stack-up 12. An exposed area of the steel workpiece 14 that is not part of the stack-up 12—i.e., it is not arranged in overlapping fashion with the aluminum workpiece 16—could also be used as the plate, which would simply tooling and help reduces costs.

Lastly, as an option, one or both of the welding electrodes 24, 28 may be outfitted with provisions on their weld faces 42, 44 for penetrating through oxide layers that could be present on the outer surface of an aluminum workpiece. For instance, if desired, the weld face(s) can be textured, roughened, or have a set of protruding rings. Examples of these are described in U.S. Pat. Nos. 6,861,609; 8,222,560; 8,274,010; 8,436,269; and 8,525,066, and in U.S. Patent Application Publication No. 2009/0255908.

The above description of preferred exemplary embodiments and related examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method comprising:
providing a workpiece stack-up that includes a steel workpiece and an aluminum or aluminum alloy workpiece;
providing a first welding electrode for contacting the steel workpiece and a second welding electrode for contacting the aluminum or aluminum alloy workpiece;
preheating the second welding electrode by passing electrical current between the first and second welding electrodes to generate heat in the second welding electrode while cooling of the second welding electrode is restricted or halted, the preheating of the second welding electrode being performed before the second welding electrode is pressed against the workpiece stack-up;
pressing the first and second welding electrodes against opposite sides of the workpiece stack-up at a weld site after preheating, the first welding electrode abutting the steel workpiece and the second welding electrode abutting the aluminum or aluminum alloy workpiece; and
passing electrical current between the first and second welding electrodes and through the workpiece stack-up at the weld site to initiate and grow a molten weld pool within the aluminum or aluminum alloy workpiece.

2. The method as set forth in claim 1, wherein the second welding electrode is constructed from a material that has an electrical conductivity of $3.48 \times 10^7$ S/m or less.

3. The method as set forth in claim 1, wherein the second welding electrode includes an insert made of a metal material with an electrical resistivity that is greater than an electrical resistivity of a material of the second welding electrode.

4. The method as set forth in claim 3, wherein the insert is made of a stainless steel, a copper-tungsten alloy, or molybdenum.

5. The method as set forth in claim 1, wherein the preheating of the second welding electrode comprises restricting a cooling operation of the second welding electrode to 50% or less of the cooling operation at full capacity during passage of the electrical current.

6. The method as set forth in claim 1, wherein the preheating of the second welding electrode comprises halting entirely a cooling operation of the second welding electrode during passage of the electrical current.

7. The method as set forth in claim 1, wherein preheating brings the second welding electrode to a temperature between 200° C. and 900° C.

8. The method as set forth in claim 7, wherein the second welding electrode is maintained at the temperature of between 200° C. and 900° C. during preheating and through initiation and growth of the weld pool within the aluminum or aluminum alloy workpiece.

9. The method as set forth in claim 1, further comprising:
ceasing the passing of electrical current between the first and second welding electrodes and through the workpiece stack-up after the molten weld pool has been initiated and grown; and
keeping the first and second welding electrodes pressed against the workpiece stack-up until the molten weld pool initiated and grown within the aluminum or aluminum alloy workpiece has solidified into a weld nugget.

10. The method as set forth in claim 1, wherein a thermocouple device or an optical infrared temperature measuring device measures a temperature of the second welding electrode at least during the preheating of the second welding electrode.

11. The method as set forth in claim 1, wherein the second welding electrode has a larger body than the first welding electrode.

12. The method as set forth in claim 1, wherein the preheating of the second welding electrode comprises:
bringing the first and second welding electrodes together such that a first weld face of the first welding electrode comes into direct contact with a second weld face of the second welding electrode;
passing electrical current between the first and second welding electrodes while the first and second weld faces are in contact.

13. The method as set forth in claim 1, wherein the preheating of the second welding electrode comprises:
pressing the first and second welding electrodes in alignment against opposite sides of a plate, the plate being made of a metal material with an electrical resistivity that is greater than that of the second welding electrode;
passing electrical current between the first and second welding electrodes and through the plate.

14. The method set forth in claim 13, wherein the plate is an exposed area of the steel workpiece that is not part of the workpiece stack-up.

15. A method comprising:
providing a workpiece stack-up that includes a steel workpiece and an aluminum or aluminum alloy workpiece;
bringing a first welding electrode and a second welding electrode together such that a first weld face of the first welding electrode comes into direct contact with a second weld face of the second welding electrode;
passing electrical current between the first and second welding electrodes at a current level of 20 kA to 40 kA while the weld faces of first and second welding electrodes are in direct contact and while cooling of the second welding electrode is restricted or halted to preheat the second welding electrode to a temperature between 200° C. and 900° C.;
separating the first welding electrode and the second welding electrode from each other;
pressing the first and second welding electrodes against opposite sides of the workpiece stack-up with the first welding electrode abutting the steel workpiece and the second welding electrode abutting the aluminum or aluminum alloy workpiece;
passing electrical current between the first and second welding electrodes and through the workpiece stack-up at the weld site to initiate and grow a molten weld pool within the aluminum or aluminum alloy workpiece; and
ceasing the passing of electrical current between the first and second welding electrodes and through the workpiece stack-up and allowing the molten weld pool to solidify into a weld nugget before retracting the first and second welding electrodes from the workpiece stack-up.

16. The method as set forth in claim 15, wherein cooling of the second welding electrode is restricted when the weld faces of the first and second welding electrodes are in direct contact by restricting a cooling operation of the second welding electrode to 50% or less of the cooling operation at full capacity.

17. The method as set forth in claim 15, wherein cooling of the second welding electrode is halted when the weld faces of the first and second welding electrodes are in direct contact.

18. The method as set forth in claim 15, wherein the electrical current is passed between the first and second welding electrodes for 100 ms to 5,000 ms.

19. The method as set forth in claim 15, wherein the second welding electrode is maintained at the temperature of between 200° C. and 900° C. during solidification of the molten weld pool.

20. A method comprising:
providing a workpiece stack-up that includes a steel workpiece and an aluminum or aluminum alloy workpiece;
providing a first welding electrode for contacting the steel workpiece and a second welding electrode for contacting the aluminum or aluminum alloy workpiece;
bringing a first weld face of the first welding electrode and a second weld face of a second welding electrode into direct contact with one another or into contact with opposite sides of a plate having an electrical resistivity that is greater than an electrical resistivity of the second welding electrode;
passing electrical current between the first and second welding electrodes while cooling of the second welding electrode is restricted or halted to preheat the second welding electrode to a temperature between 200° C. and 900° C.;
separating the first and second weld faces of the first and second welding electrodes, respectively, from each other or from the opposite sides of the plate;
pressing the first and second welding electrodes against opposite sides of the workpiece stack-up at a weld site after the second welding electrode is preheated to between 200° C. and 900° C., the first welding electrode abutting the steel workpiece and the second welding electrode abutting the aluminum or aluminum alloy workpiece; and
passing electrical current between the first and second welding electrodes and through the workpiece stack-up at the weld site to initiate and grow a weld pool within the aluminum or aluminum alloy workpiece.

* * * * *